United States Patent [19]
Blecha

[11] Patent Number: 5,909,867
[45] Date of Patent: Jun. 8, 1999

[54] CLOSING ASSEMBLY FOR A CHAMBER HAVING A THROUGH-OPENING

[75] Inventor: Thomas Blecha, Feldkirch, Australia

[73] Assignee: VAT Holding AG, Haag, Switzerland

[21] Appl. No.: 09/085,431

[22] Filed: May 27, 1998

[51] Int. Cl.$^6$ .................................................. F16K 3/314
[52] U.S. Cl. ............................................ 251/328; 251/329
[58] Field of Search ..................................... 251/328, 329, 251/326

[56] References Cited

U.S. PATENT DOCUMENTS

| | | | |
|---|---|---|---|
| 769,831 | 9/1904 | Ogden ....................................... | 251/328 |
| 3,285,565 | 11/1966 | Barnier et al. ....................... | 251/328 X |
| 4,401,292 | 8/1983 | Whaley ................................ | 251/328 X |
| 4,573,616 | 3/1986 | Shapland ................................. | 251/326 |
| 4,809,950 | 3/1989 | Geiser ...................................... | 251/328 |
| 4,881,717 | 11/1989 | Geiser ................................... | 251/327 X |
| 5,271,602 | 12/1993 | Funaba ................................. | 251/326 X |

*Primary Examiner*—Stephen M. Hepperle
*Assistant Examiner*—John Bastianelli
*Attorney, Agent, or Firm*—Anderson, Kill & Olick, P.C.

[57] ABSTRACT

A closing assembly for a chamber including, a housing-like member, a closing plate displaceable in the housing-like member for closing the chamber through-opening, and a drive unit for displacing the closing plate, with the housing-like member having two mutually perpendicular flange-like connection surfaces defining an angle of 90° therebetween, and with attachment screws-receiving bores having their axis extending approximately parallel to the bisectrix of the angle formed by the two connection surfaces.

5 Claims, 3 Drawing Sheets

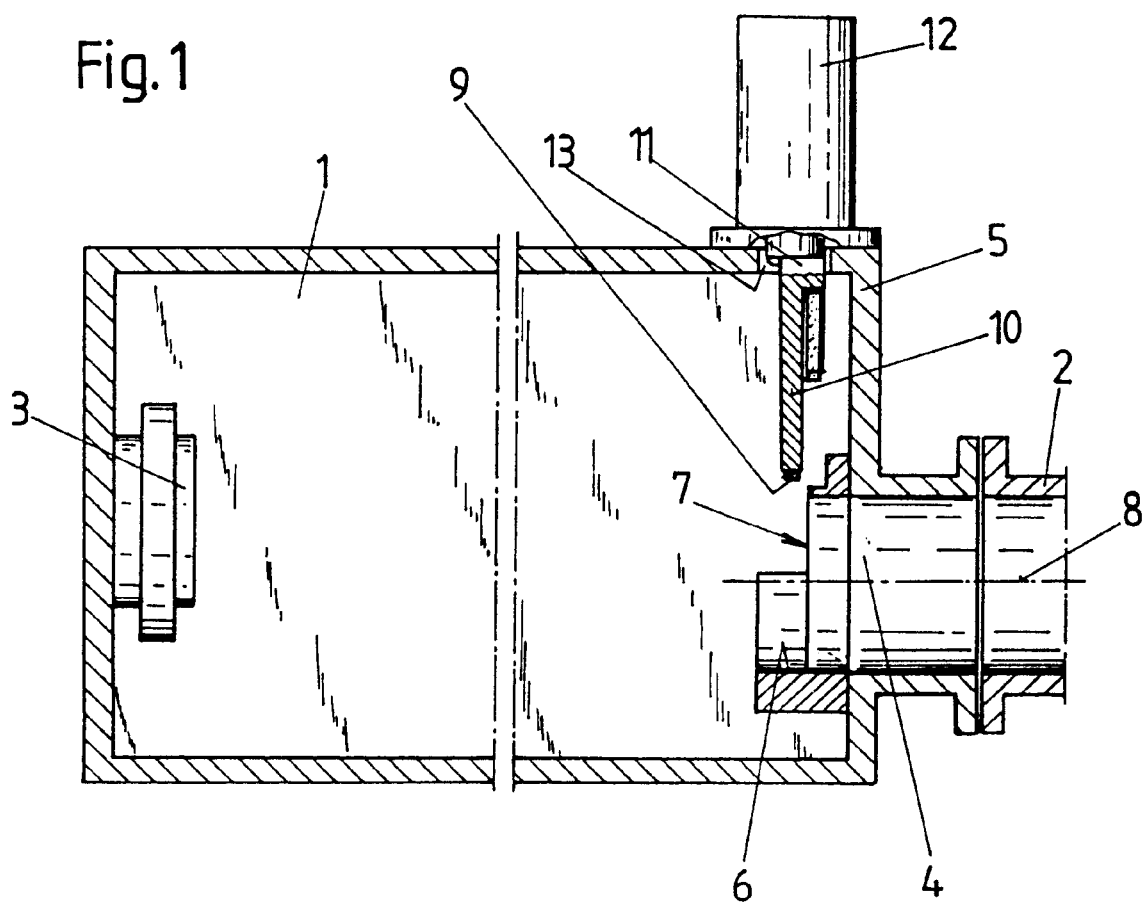

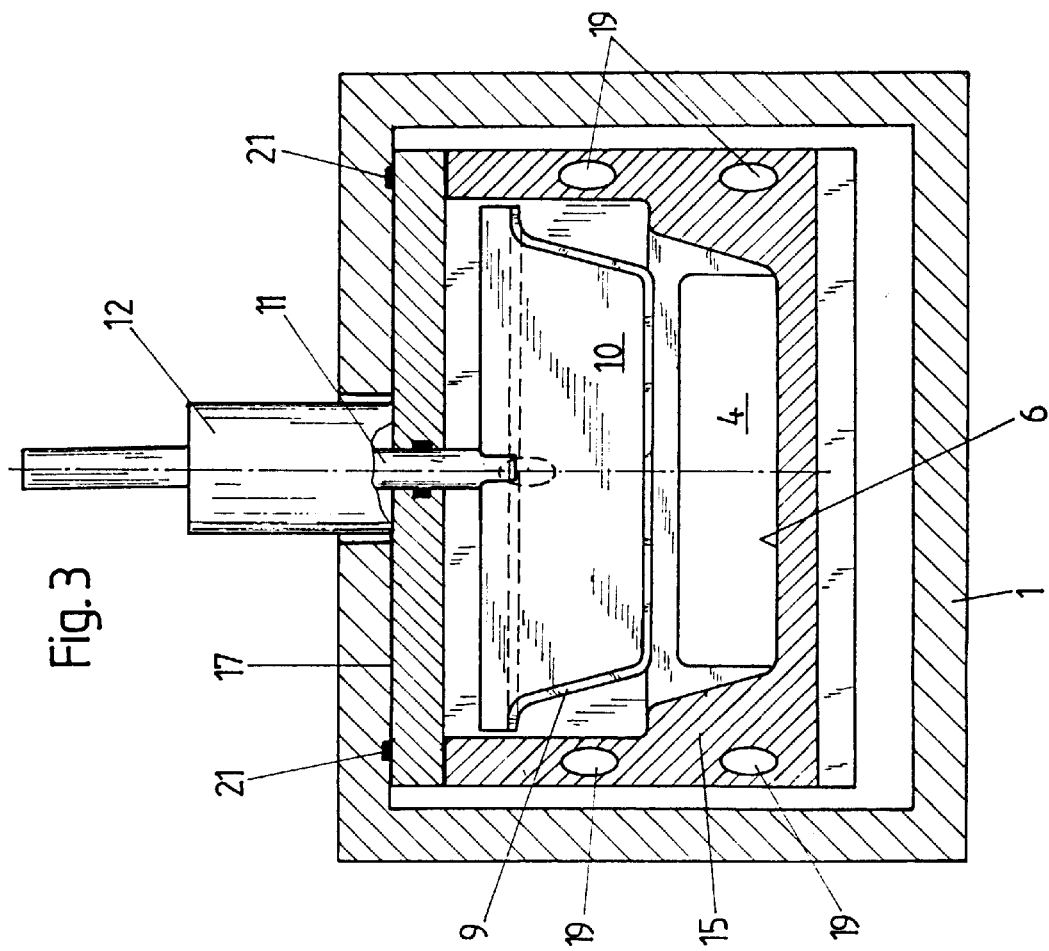
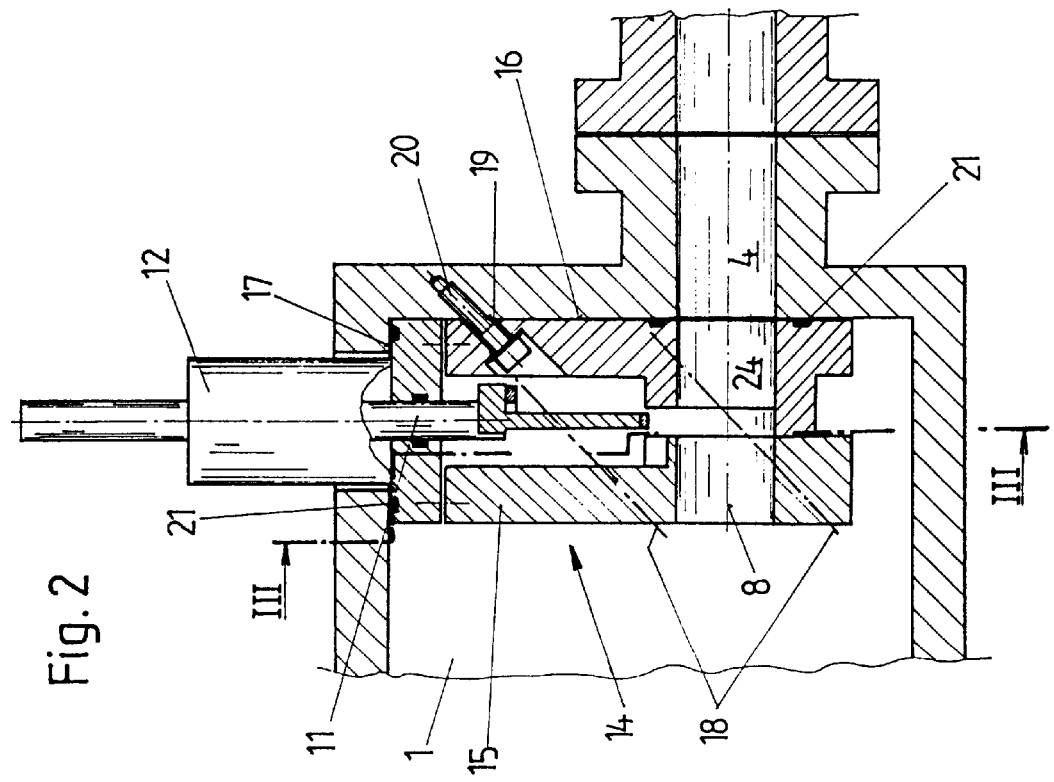

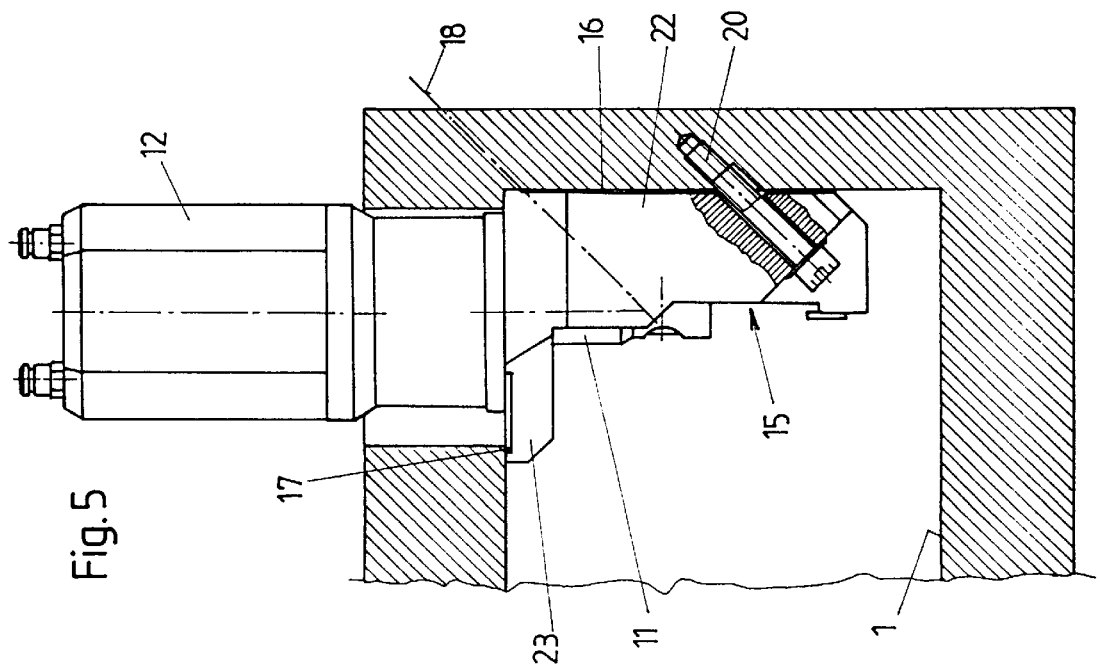
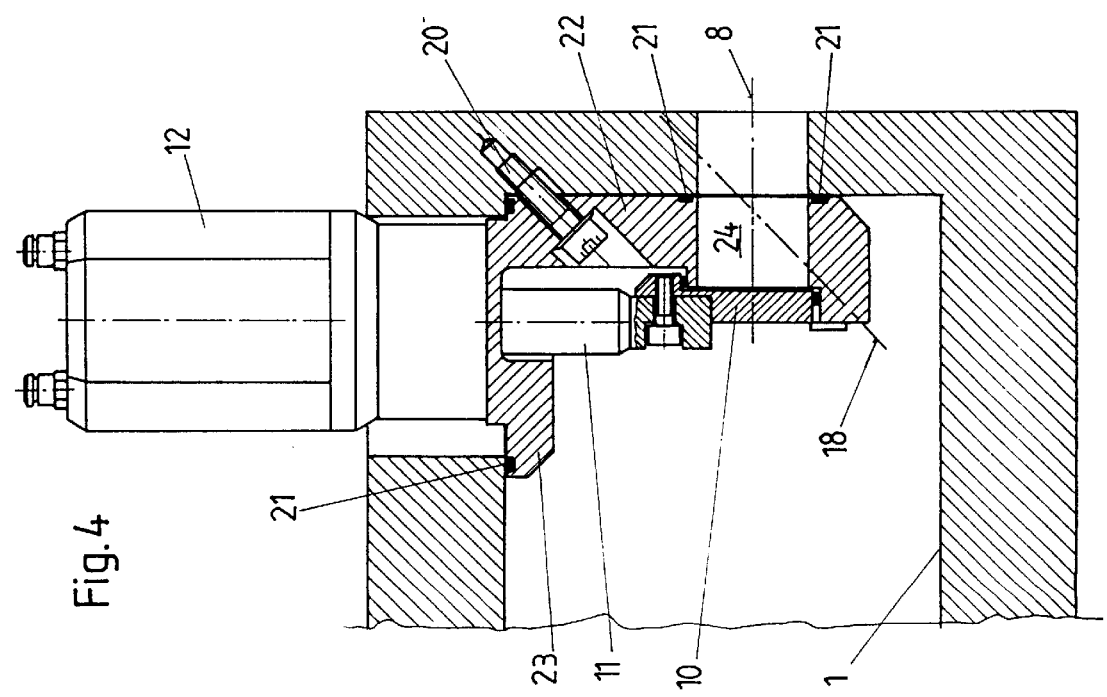

CLOSING ASSEMBLY FOR A CHAMBER HAVING A THROUGH-OPENING

BACKGROUND OF THE INVENTION

1. Field of the Invention

The present invention relates to a closing assembly for a chamber having a through-opening, which closing assembly includes a closing plate displaceable perpendicular to an axis of the through-opening between an open position in which the through-opening remains open, and a closed position in which the closing plate sealingly closes the through-opening, a drive for displacing the closing plate between the open and closed positions of the closing plate, and a housing-like member in which the closing plate is displaceable, with the housing-like member having two flange-surfaces one of which surrounds the through-opening of the chamber, and with the housing-like member having a plurality of through-bores for receiving attachment screws for securing the closing assembly to a housing in which the through-opening is formed.

2. Description of the Prior Art

It is known to use vacuum chambers for handling, storing and/or for passing objects there-through, and it is known to provide such vacuum chambers with a closing member having a seal and a sealing surface. The sealing surface is located in the chamber and is arranged sidewise of the opening and forms, together with the seal, a structural component. The linear sealing surface extends parallel to the axis of the through-opening and has at least two sealing surface portions which are laterally offset relative to each other in the direction of the through-opening axis. A displaceable closing plate has a shape permitting a sealing closure of the chamber by being displaced linearly in a simple way. The closing plate and its displacement drive form a separate structural component. Such a closing assembly is disclosed in U.S. Pat. No. 4,881,717. The mounting of the closing member and of the closing plate should meet extremely high requirements as the two, separately produced and separately mounted structural components should be located in the chamber in a precisely determined relationship relative to each other to insure a sealing closure of the through-opening in the closing position of the closing plate to prevent any loss of vacuum in the chamber. In addition to the through-opening for bringing work pieces into the chamber, the chamber is provided with another opening through which the closing plate projects into the interior of the chamber, with the displacement drive being located outside of the chamber. The two mentioned here structural components which, as discussed above, are separately mounted, are located in a region of the chamber in which two walls of the chamber, which are associated, respectively, with the two above-discussed structural components, extend at a right angle to each other and abut each other, forming at the butt location a common edge.

An object of the present invention is to provide a closing assembly formed as a unitary structural component insertable into the chamber.

Another object of the present invention is to provide a unitary closing assembly which would insure its simple and easy mounting.

SUMMARY OF THE INVENTION

These and other objects of the present invention, which will become apparent hereinafter, are achieved by providing a closing assembly in which the two flange-like connection surfaces of the housing-like member form together an angle of 90°, and in which the axes of the through-bores for securing the housing-like member to the chamber extend approximately parallel to the bisectrix of the 90° angle formed by the two connection surfaces.

The foregoing novel features of the present invention permit to mount the closing assembly according to the present invention in a region of the chamber in which two chamber walls extend at a right angle to each other and form together a common edge at their butt joint. At that, due to the inclined position of the attachment screws, they impart to the housing-like member a force having two components extending perpendicular to the two connection surfaces. The two force components insure that the two flange-like connection surfaces tightly abut the two chamber walls forming a right angle there between. This is because the two flange-like connection surfaces extend parallel to the respective walls of the chamber as both the connection surfaces and the chamber walls form an angle of 90°.

BRIEF DESCRIPTION OF THE DRAWINGS

The features and objects of the present invention will become more apparent, and the invention itself will be best understood from the following detailed description of the preferred embodiments when read with reference to the accompanying drawings, wherein:

FIG. 1 shows a longitudinal cross-section view of a prior art vacuum chamber;

FIG. 2 shows a longitudinal cross-sectional view of a vacuum chamber similar to that shown in FIG. 1 but with a closing assembly according to the present invention;

FIG. 3 shows a cross-sectional view along line III—III in FIG. 2;

FIG. 4 shows a longitudinal cross-sectional view similar to that of FIG. 2 but with another embodiment of a closing assembly according to the present invention; and FIG. 5 shows a cross-sectional view of the vacuum chamber shown in FIG. 4 taken sidewise of the closing assembly, with the vertical leg of the housing portion being partially cut off.

DESCRIPTION OF THE PREFERRED EMBODIMENTS

In the drawings, the same and functionally similar elements will be designated with the same reference numerals.

As it has already been mentioned, FIG. 1 shows a cross-sectional view of a prior art vacuum chamber. In FIG. 1, a vacuum chamber 1 is connected by a pipe conduit 2 with a vacuum apparatus, not shown. An insert 3 is used for treatment of workpieces which can be introduced into the chamber 1 through an opening 4 which is formed in a side wall 5 of the chamber 1. A structural component 7, which includes a sealing surface 6, is arranged on the side wall 5 in the interior of the chamber 1 laterally of the opening 4. The structural component 7 is fixedly connected to the side wall 5, e.g., by screws or by being welded thereto. A closing plate 10 carrying a sealing element 9 is supported in the chamber 1 for linear movement perpendicular to an axis 8 of the opening 4. The closing plate 10 is displaceable by a piston rod 11 and a piston-cylinder unit 12. The piston rod 11 extends into the chamber 1 through an opening 13. The piston-cylinder unit 12 is enclosed in a housing which is flange-mounted on the upper wall of the chamber 1 with an intermediate sealing member, not shown. The closing plate 10 and the piston-cylinder unit 12 represent a unit which is produced and mounted separated from the structural component 7, and it is very expensive to mount both structural components inside of the chamber 1 relative to each other in such a way that the closing plate 10, upon being displaced into its closing position, would insure an adequate vacuum-tight sealing.

A closing assembly according to the present invention is shown in FIG. 2. The inventive closing assembly 14 is formed as a unitary structural body having a housing-like member 15 with two flange-like connection surfaces 16 and 17. Both connection surfaces 16 and 17 extend perpendicular to each other and form together an angle of 90°. The housing-like member 15 has through-bores 19 for receiving attachment screws 20. The axes of the through-bores 19 are shown with dash-dot lines. These through-bores 19 extend at an angle to both connection surfaces 16 and 17 and extend somewhat parallel to a bisectrix 18 of the angle formed by the two connection 16 and 17. The screwed-in and tightened attachment screws 20 impart to the housing-like member 15 a force which components extending, respectively, perpendicular to the two connection surfaces 16 and 17 insure that both connection surfaces 16 and 17 are tightly pressed against respective walls of the chamber 1. Preferably, the connection surfaces 16 and 17 are provided with sealing elements 21. The housing-like member 15 is substantially formed as a housing of a slide. However, the connection surfaces 16 and 17 extend not parallel to each other as in the case of a slide housing, but perpendicular to each other, as discussed above. As shown in FIGS. 2–3, of the connection surfaces, the horizontal surface 17, supports the piston-cylinder unit 12 for displacing the closing plate 10.

The housing-like member 15 of an embodiment of a closing assembly shown in FIGS. 4 and 5, is simpler than that of the embodiment shown in FIGS. 2–3. In the embodiment shown in FIGS. 4–5, the housing-like member 15 is L-shaped and has a vertical leg 22 and a horizontal leg 23, with the outer surfaces of the legs 22, 23 forming, respectively, the connection surfaces 16 and 17. In FIGS. 4 and 5, the closing plate 10, which is displaceable within the housing-like member 15, is shown in its closed position. The piston-cylinder unit 12 is supported by the horizontal leg 23.

The two embodiments of a closing assembly according to the present invention distinguish from each other by the shape of the housing-like member 15 which, in the simplified version shown in FIGS. 4 and 5, is formed as a L-shaped member with two legs 22 and 23 extending perpendicular to each other.

Though the present invention was shown and described with references to the preferred embodiments, various modifications thereof will be apparent to those skilled in the art and, therefore, it is not intended that the invention be limited to the disclosed embodiments or details thereof, and departure can be made therefrom within the spirit and scope of the appended claims.

What is claimed is:

1. A closing assembly for a chamber having a through-bore, the closing assembly comprising:

a closing plate displaceable perpendicular to an axis of the through-opening between an open position in which the through-opening remains open, and a closed position in which the closing plate sealingly closes the through-opening;

drive means for displacing the closing plate between the open and closed positions of the closing plate; and a housing-like member in which the closing plate is displaceable;

wherein the housing-like member has two flange-like connection surfaces one of which surrounds the through opening of the chamber and which together form an angle of 90° with each other;

wherein the housing-like member has a plurality of through-bores for receiving attachment screws for securing the housing-like member in the chamber, with the axes of the through-bores extending approximately parallel to a bisectrix of the angle formed by the two connection surfaces, and wherein the closing plate sealingly engages the one of the two connection surfaces which surrounds the through-bore in the closing position of the closing plate.

2. A closing assembly as set forth in claim 1, wherein another of the two connection surfaces extends parallel to the axis of the through-opening and supports the drive unit for displacing the closing plate.

3. A closing assembly as set forth in claim 1, wherein the attachment screw-receiving bores are distributed around the through-opening.

4. A closing assembly as set forth in claim 1, wherein one of the attachment screw receiving bores lies in an apex region of both connection surfaces.

5. A closing assembly as set forth in claim 1, wherein the housing-like member is formed as an L-shaped member with outer surface of two legs forming the flange-like connection surfaces.

* * * * *